United States Patent
Yoon et al.

(10) Patent No.: US 10,770,765 B2
(45) Date of Patent: Sep. 8, 2020

(54) BATTERY MODULE WITH IMPROVED FRAME STRUCTURE AND FRAME ASSEMBLY FOR THE BATTERY MODULE

(71) Applicant: LG CHEM, LTD., Seoul (KR)

(72) Inventors: Ji-Su Yoon, Daejeon (KR); Dal-Mo Kang, Daejeon (KR); Jeong-O Mun, Daejeon (KR); Mi-Geum Choi, Daejeon (KR); Sung-Won Seo, Daejeon (KR); Hee-Jun Jin, Daejeon (KR); Yoon-Koo Lee, Daejeon (KR); Sang-Woo Ryu, Daejeon (KR)

(73) Assignee: LG Chem, Ltd., Seoul (KR)

( * ) Notice: Subject to any disclaimer, the term of this patent is extended or adjusted under 35 U.S.C. 154(b) by 144 days.

(21) Appl. No.: 15/717,121

(22) Filed: Sep. 27, 2017

(65) Prior Publication Data
US 2018/0090799 A1 Mar. 29, 2018

(30) Foreign Application Priority Data

Sep. 28, 2016 (KR) .......................... 10-2016-0124856

(51) Int. Cl.
| | |
|---|---|
| *H01M 10/613* | (2014.01) |
| *H01M 10/6556* | (2014.01) |
| *H01M 10/6566* | (2014.01) |
| *H01M 10/625* | (2014.01) |
| *H01M 2/10* | (2006.01) |
| *H01M 10/6563* | (2014.01) |

(52) U.S. Cl.
CPC ...... *H01M 10/6566* (2015.04); *H01M 2/1077* (2013.01); *H01M 10/613* (2015.04); *H01M 10/625* (2015.04); *H01M 10/6556* (2015.04); *H01M 10/6563* (2015.04); *H01M 2220/20* (2013.01)

(58) Field of Classification Search
None
See application file for complete search history.

(56) References Cited

U.S. PATENT DOCUMENTS

| | | | |
|---|---|---|---|
| 8,986,863 B2 | 3/2015 | Choi et al. | |
| 9,499,068 B2 | 11/2016 | Yang et al. | |
| 9,660,231 B2 | 5/2017 | Yoon | |
| 2008/0220324 A1* | 9/2008 | Phillips | B25F 5/02 429/120 |

(Continued)

FOREIGN PATENT DOCUMENTS

| | | |
|---|---|---|
| KR | 10-2012-0134010 A | 12/2012 |
| KR | 10-2013-0090339 A | 8/2013 |

(Continued)

*Primary Examiner* — Yoshitoshi Takeuchi
(74) *Attorney, Agent, or Firm* — Morgan, Lewis & Bockius LLP

(57) ABSTRACT

Disclosed is a battery module, which includes a cell assembly composed of a plurality of cells, and a frame assembly having a bottom plate supporting the cell assembly from a lower portion, a side plate perpendicular to the bottom plate and disposed adjacent to an outermost side of the cell assembly, and a top plate covering an upper portion of the cell assembly, wherein a groove forming an external air inflow space between the side plate and the cell assembly is formed at the side plate to elongate in a length direction thereof.

8 Claims, 4 Drawing Sheets

(56) References Cited

U.S. PATENT DOCUMENTS

| | | | |
|---|---|---|---|
| 2010/0279152 A1* | 11/2010 | Payne | H01M 10/0413 |
| | | | 429/50 |
| 2013/0202926 A1* | 8/2013 | Yoon | H01M 2/1022 |
| | | | 429/82 |
| 2014/0356684 A1 | 12/2014 | Lim | |
| 2016/0093929 A1* | 3/2016 | Obasih | H01M 10/0525 |
| | | | 429/120 |
| 2016/0233465 A1 | 8/2016 | Lee et al. | |

FOREIGN PATENT DOCUMENTS

| KR | 10-2014-0140678 A | 12/2014 |
|---|---|---|
| KR | 10-2014-0140679 A | 12/2014 |
| KR | 10-2014-0144784 A | 12/2014 |
| KR | 10-2016-0016499 A | 2/2016 |

* cited by examiner

BATTERY MODULE WITH IMPROVED FRAME STRUCTURE AND FRAME ASSEMBLY FOR THE BATTERY MODULE

TECHNICAL FIELD

The present application claims priority to Korean Patent Application No. 10-2016-0124856 filed on Sep. 28, 2016 in the Republic of Korea, the disclosures of which are incorporated herein by reference.

The present disclosure relates to a battery module, and more particularly, to a battery module having a structure capable of cooling cells, and a frame assembly for the battery module.

BACKGROUND ART

Generally, a battery module is formed to have a structure in which a plurality of cells are aggregated by means of serial and/or parallel connection. The battery module typically includes a cell assembly in which a plurality of cells are arranged and stacked in one direction, and a frame having a plate capable of covering the cell assembly.

In a conventional battery module, when a cooling channel is separately designed for cooling the battery cells in a water-cooling manner, a space occupied by the cooling channel is separately required, so that it is difficult to simplify the structure and there is a limit in the capacity of mountable cells. In other words, as shown in FIG. 1, in the conventional battery module, a cooling water inflow tube 12 is generally added to a portion of an inner space of a frame 10 in which a cell assembly 11 is disposed. However, this configuration makes it difficult to reduce the weight of the module, demands much space for installing components in the module, and increases the cost.

Regarding the cooling technology of the battery module, Patent Literature 1 discloses a battery pack, in which a guide member is installed between a first battery module group and a second battery module group, so that a channel of a heat exchange medium passing through the first battery module group is changed. According to Patent Literature 1, the heat exchange medium passing through the battery module is obstructed by the guide member, so that a heat exchange medium is directed toward a lower portion of the guide member. At this time, the inside of the guide member is curved, and so it is possible to prevent the generation of turbulence in the heat exchange medium.

Patent Literature 2 discloses a battery module, which includes a plurality of cartridges and a cooling duct for supplying a cooling gas to the outside of the plurality of stacked cartridges, wherein the cooling duct supplies the cooling gas so that the cooling gas comes into direct contact with the outer surface of the cartridge.

In spite of the above technologies, the conventional battery module still has problems in that the components to be added for cooling increases the weight of the battery module and decreases the volume ratio of the battery module.

RELATED LITERATURES

Patent Literature

Patent Literature 1: Korean Unexamined Patent Publication No. 2014-0140678

Patent Literature 2: Korean Unexamined Patent Publication No. 2016-0016499

DISCLOSURE

Technical Problem

The present disclosure is designed to solve the problems of the related art, and therefore the present disclosure is directed to providing a battery module, which may secure a cooling channel by utilizing a frame supporting a battery cell, and a frame assembly for the battery module.

The present disclosure is also directed to providing a battery module, which may allow an external air generated by a running vehicle to flow into the battery module, and a frame assembly for the battery module.

Technical Solution

In one aspect of the present disclosure, there is provided a battery module, comprising: a cell assembly composed of a plurality of cells; and a frame assembly having a bottom plate supporting the cell assembly from a lower portion, a side plate perpendicular to the bottom plate and disposed adjacent to an outermost side of the cell assembly, and a top plate covering an upper portion of the cell assembly, wherein an external air inflow space is provided between the side plate and the cell assembly.

The external air inflow space may be provided by at least one groove formed at an inner side of the side plate to elongate in a length direction of the side plate.

The groove may be formed by curving a portion of the side plate outwards.

The groove may be provided in plural at predetermined intervals in a height direction of the side plate.

Both end portions of at least one of the bottom plate and the top plate may be bent vertically to be disposed adjacent to an end of the cell assembly, and external air inflow slits may be formed at both end portions at predetermined intervals.

In another aspect of the present disclosure, there is also provided a frame assembly of a battery module, which supports a cell assembly at an outside of the battery module, the frame assembly comprising: a bottom plate supporting the cell assembly from a lower portion; a side plate perpendicular to the bottom plate and disposed adjacent to an outermost side of the cell assembly; and a top plate covering an upper portion of the cell assembly, wherein a groove forming an external air inflow space between the side plate and the cell assembly is formed at the side plate to elongate in a length direction thereof.

Advantageous Effects

According to the present disclosure, a space for the cooling plate may be secured by improving a side plate structure of the frame assembly without adding separate cooling components, and thus it is possible to improve the cell cooling performance without increasing the weight of the battery module or decreasing the volume ratio of the battery module.

Therefore, if the present disclosure is applied, it is possible to stack more cells, which may increase cell capacity and contribute to cost reduction.

DESCRIPTION OF DRAWINGS

The accompanying drawings illustrate a preferred embodiment of the present disclosure and together with the foregoing disclosure, serve to provide further understanding of the technical features of the present disclosure, and thus, the present disclosure is not construed as being limited to the drawing.

BEST MODE

Hereinafter, preferred embodiments of the present disclosure will be described in detail with reference to the accompanying drawings. Prior to the description, it should be understood that the terms used in the specification and the appended claims should not be construed as limited to general and dictionary meanings, but interpreted based on the meanings and concepts corresponding to technical aspects of the present disclosure on the basis of the principle that the inventor is allowed to define terms appropriately for the best explanation. Therefore, the description proposed herein is just a preferable example for the purpose of illustrations only, not intended to limit the scope of the disclosure, so it should be understood that other equivalents and modifications could be made thereto without departing from the scope of the disclosure.

Figure 1:
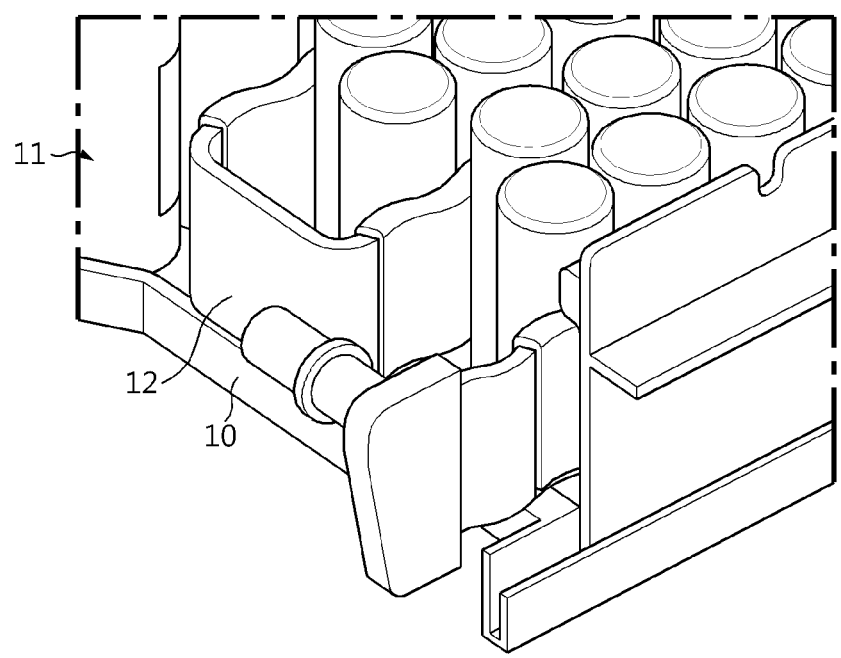
FIG. 1 is a cross-sectional view showing a conventional battery module.
Figure 2:
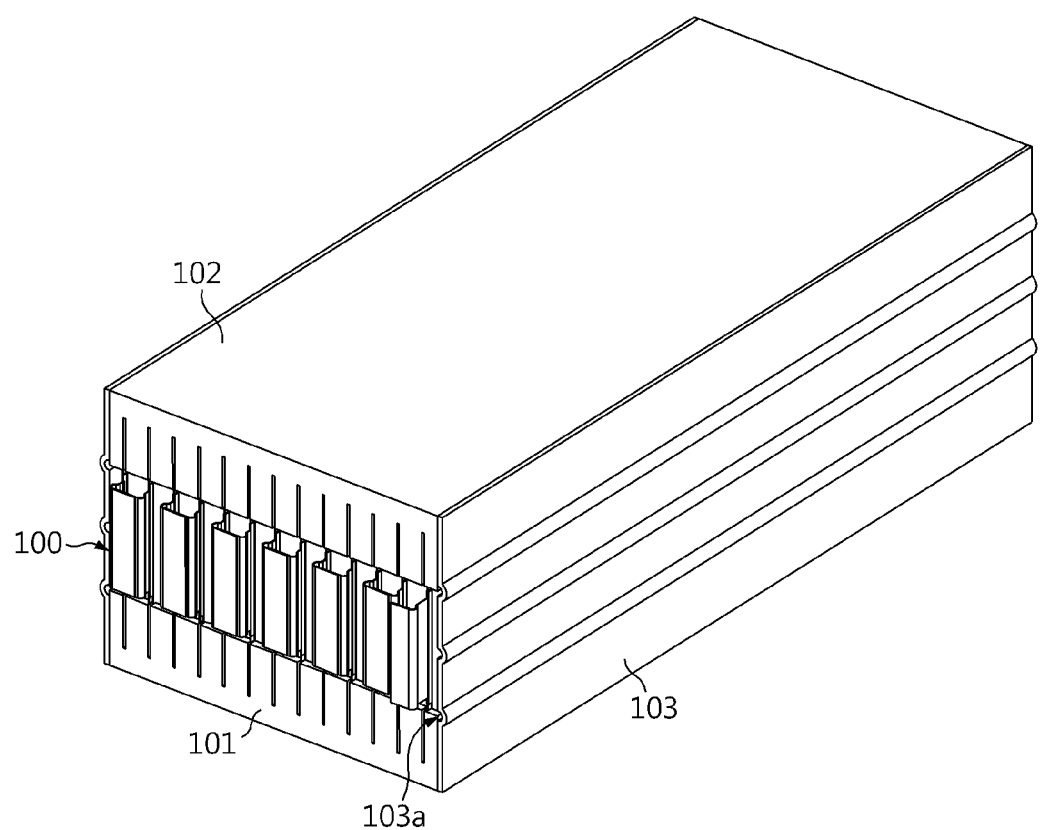
FIG. 2 is a perspective view showing an appearance of a battery module according to an embodiment of the present disclosure.
Figure 3:
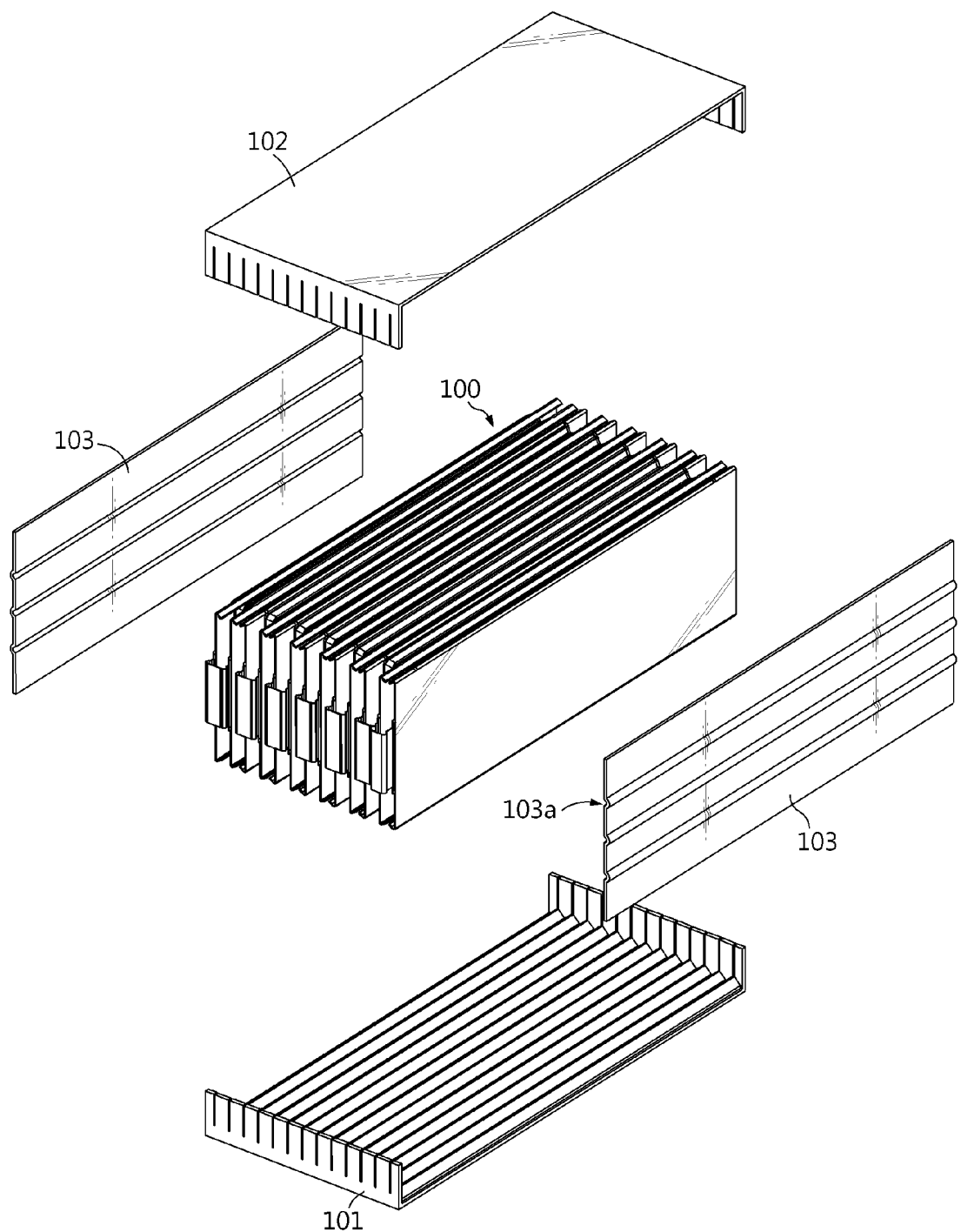
FIG. 3 is an exploded perspective view of FIG. 2.

FIG. 2 is a perspective view showing an appearance of a battery module according to an embodiment of the present disclosure, and FIG. 3 is a partially exploded perspective view of FIG. 2.

Referring to FIGS. 2 and 3, a battery module according to an embodiment of the present disclosure includes a cell assembly 100 composed of a plurality of cells, and a frame assembly having a bottom plate 101 supporting the cell assembly 100 from a lower portion, a side plate 103 disposed adjacent to an outermost side of the cell assembly 100 and having a groove 103a elongating in a length direction to form an external air inflow space, and a top plate 102 covering an upper portion of the cell assembly 100.

Each cell of the cell assembly 100 has a thin plate-like body and preferably has a pouch cell structure. The pouch cell is configured so that a positive electrode, a separator and a negative electrode are stacked alternately and an electrode tab is drawn in at least one direction. The positive electrode and the negative electrode are prepared by coating slurry containing an electrode conductive material, a binder resin, a conductive agent and other additives on at least one surface of a current collector. In case of the positive electrode, the electrode conductive material may employ a common positive electrode conductive material such as an lithium-containing transition metal oxide, and in case of the negative electrode, the electrode conductive material may employ a common negative electrode conductive material such as lithium metal, carbon material, metal compound, and mixtures thereof, which may intercalate or de-intercalate lithium ions. In addition, the separator may adopt a common porous polymer film used for a lithium secondary battery.

The electrolyte accommodate in the pouch case together with an electrode assembly may adopt a common electrolyte for a lithium secondary battery. The pouch case is made of a sheet material and has an accommodation portion for accommodating the electrode assembly. Preferably, the pouch case is formed by coupling a first case and a second case which are prepared by processing a sheet material into a predetermined shape. The sheet material forming the pouch case has a multi-layered structure in which an outer resin layer provided at an outermost side and made of an insulating material such as polyethylene terephthalate (PET) or nylon, a metal layer made of aluminum to maintain mechanical strength and prevent penetration of moisture and oxygen, and an inner resin layer made of polyolefin-based material having a thermal bonding property to serve as a sealing agent are laminated.

In the sheet material forming the pouch case, if required, a predetermined adhesive resin layer may be interposed between the inner resin layer and the metal layer and between the outer resin layer and the metal layer. The adhesive resin layer is formed in a single layer or multiple layers to ensure each attachment between different kinds of materials and may be generally made of polyolefin-based material, or polyurethane resin for better processing, or a mixture thereof.

In the cell assembly 100, the plurality of cells are arranged in one direction to form a substantially stacked structure.

The frame assembly is a structure for accommodating the cell assembly 100 to support and protect the cell assembly 100, and includes a bottom plate 101 located below the cell assembly 100, a side plate 103 disposed adjacent to an outermost side of the cell assembly 100, and a top plate 102 covering an upper portion of the cell assembly 100. Each plate 101, 102, 103 of the frame assembly is made of a metal plate with a small thickness, for example an aluminum sheet.

The bottom plate 101 has a base surface capable of supporting lower ends of the plurality of cells in a lump.

The side plate 103 is made of a metal plate having relatively a small width (height) and a great length, and is perpendicular to a plane of the bottom plate 101 and disposed adjacent to the outermost side of the cell assembly 100.

Figure 4:
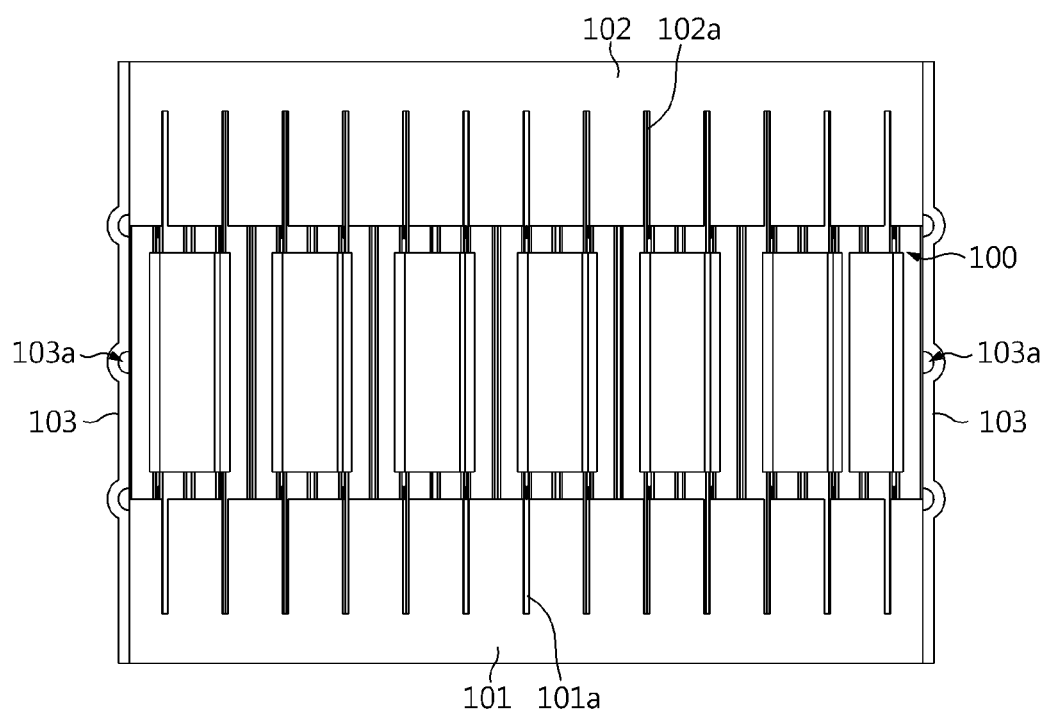
FIG. 4 is a partially sectioned view of FIG. 2.

As shown in FIG. 4, a groove 103a forming an external air inflow space between the side plate 103 and the cell assembly 100 is formed at the side plate 103 to elongate in a length direction thereof. The groove 103a is formed by curving a portion of the side plate 103 outwards by means of bending or the like. At this time, the groove 103a has an elongated pattern to be continuously connected from one end of the side plate 103 in the length direction to the other end thereof. In the portion of the side plate 103 where the groove 103a is formed, an inner surface (a surface facing the cell) is concave, and an outer surface opposite thereto is convex. In order to reduce air resistance, the concave portion and the convex portion may be designed to be rounded. Thus, the groove preferably has a semicircular section. As an alternative, the sectional shape of the groove may be modified into various patterns. The number, length, angle or the like of the grooves elongating in the length direction of the side plate 103 are not limited to those depicted in the figures and may be modified in various ways.

In addition, the groove may have a curved pattern or a zigzag pattern, without being limited to a linear pattern.

The groove 103a may be formed by means of a beading process. As an alternative, the groove 103a may be formed by means of an engraving process in which only an inner surface of the side plate 103, namely a surface toward the cell assembly 100, is concavely patterned. In this case, the groove 103a may also be formed in various patterns as described above.

The groove 103a plays a role of guiding the flow of an external air, generated while a vehicle having the battery module is running, to the inside of the module. The groove 103a is provided in plural at predetermined intervals in the height direction of the side plate 103.

The top plate 102 is disposed adjacent to the side plate 103 to cover the upper portion of the cell assembly 100.

Both end portions of the bottom plate 101 and the top plate 102 are bent perpendicular to the plate surface and disposed adjacent to the end of the cell assembly 100, and external air inflow slits 101a, 102a are formed at both end portions at predetermined intervals. In order to maximize the cooling efficiency, the external air inflow slits 101a, 102a may extend in a vertical direction substantially in parallel to the cells as shown in FIG. 4.

The battery module according to an embodiment of the present disclosure as configured above is assembled so that the plurality of cells are coupled to the frame assembly, and a final product is mounted to a vehicle to supply power thereto.

The battery module according to an embodiment of the present disclosure has the external air inflow space between the side plate 103 and the cell assembly 100, and thus the flow of external air generated while a vehicle is running is guided to the inside of the battery module through the external air inflow space to perform air-cooling.

The frame assembly of the battery module includes the side plate 103 in which the groove 103a serving as a cooling channel is formed in the length direction to provide the external air inflow space.

The flow of external air generated while a vehicle is running is introduced through the groove 103a formed in the side plate 103 to flow along the length direction of the groove 103a and simultaneously flow toward the cell assembly 100 to cool the cell assembly 100.

In addition, the flow of external air generated while a vehicle is running is also guided to the inside of the battery module by the external air inflow slits 101a, 102a formed at both end portions of the bottom plate 101 and the top plate 102 to pass through the battery module, during which the cell assembly 100 is air-cooled.

The battery module according to the present disclosure cools cells by the side plate 103 or the like of the frame assembly without adding any separate cooling component, and thus it is possible to simplify the battery module and reduce the cost.

The present disclosure has been described in detail. However, it should be understood that the detailed description and specific examples, while indicating preferred embodiments of the disclosure, are given by way of illustration only, since various changes and modifications within the scope of the disclosure will become apparent to those skilled in the art from this detailed description.

| Reference Signs | |
|---|---|
| 100: cell assembly | 101: bottom plate |
| 101a, 102a: slit | 102: top plate |
| 103: side plate | 103a: groove |

What is claimed is:

1. A battery module, comprising:
   (1) a cell assembly including a plurality of cells adjacently arranged along a length direction; and
   (2) a frame assembly having
      (2a) a bottom plate supporting the cell assembly from a lower portion,
      (2b) a side plate perpendicular to the bottom plate and extending in the length direction to be in direct contact with the cells at an outermost side of the cell assembly, and
      (2c) a top plate covering an upper portion of the cell assembly,
   wherein an external air inflow space is provided in the length direction between the side plate and the cell assembly, and
   wherein the external air inflow space has ends open to an outside of the battery module such that an entirety of a flow path through the external air inflow space between the ends is straight.

2. The battery module according to claim 1, wherein the external air inflow space includes at least one groove at an inner side of the side plate extending an entire length of the side plate in the length direction, and wherein the side plate does not directly contact the cell assembly along the groove.

3. The battery module according to claim 2, wherein the groove is formed by curving a portion of the side plate outwards.

4. The battery module according to claim 3, wherein the groove is provided in plural at predetermined intervals in a height direction of the side plate.

5. The battery module according to claim 1, wherein both end portions of at least one of the bottom plate and the top plate are bent vertically to be disposed adjacent to an end of the cell assembly, and wherein external air inflow slits are formed at both end portions at predetermined intervals.

6. The battery module according to claim 1, wherein the external air inflow space includes a groove having a rounded concave pattern on an inner surface of the side plate such that the side plate does not directly contact the cell assembly along the groove.

7. The battery module according to claim 6, wherein the external air inflow space has a semicircular cross-sectional shape.

8. The battery module according to claim 6, wherein the groove is continuously connected with the rounded concave pattern from one end to the other end in the length direction.

\* \* \* \* \*